(12) United States Patent
Jin et al.

(10) Patent No.: US 9,952,071 B2
(45) Date of Patent: Apr. 24, 2018

(54) SENSOR UNIT, ARMOR BODY FOR SENSOR MODULE, ELECTRONIC DEVICE, AND MOVING OBJECT

(71) Applicant: SEIKO EPSON CORPORATION, Tokyo (JP)

(72) Inventors: Mikimoto Jin, Chino (JP); Tsutomu Taniguchi, Mastsumoto (JP)

(73) Assignee: Seiko Epson Corporation (JP)

( * ) Notice: Subject to any disclaimer, the term of this patent is extended or adjusted under 35 U.S.C. 154(b) by 25 days.

(21) Appl. No.: 14/774,598

(22) PCT Filed: Mar. 7, 2014

(86) PCT No.: PCT/JP2014/001283
§ 371 (c)(1),
(2) Date: Sep. 10, 2015

(87) PCT Pub. No.: WO2014/141657
PCT Pub. Date: Sep. 18, 2014

(65) Prior Publication Data
US 2016/0025525 A1 Jan. 28, 2016

(30) Foreign Application Priority Data
Mar. 15, 2013 (JP) .................................. 2013-053258

(51) Int. Cl.
*G01D 11/24* (2006.01)
*G01C 19/5783* (2012.01)
*G01P 1/02* (2006.01)

(52) U.S. Cl.
CPC ....... *G01D 11/245* (2013.01); *G01C 19/5783* (2013.01); *G01P 1/023* (2013.01)

(58) Field of Classification Search
CPC .............................. G01D 11/24; G01D 11/245
(Continued)

(56) References Cited

U.S. PATENT DOCUMENTS 6,262,520 B1 * 7/2001 Knowles ................ H03H 9/215
310/370
6,534,711 B1 * 3/2003 Pollack ................ H01L 23/057
174/529

(Continued)

FOREIGN PATENT DOCUMENTS

JP H07-008775 U 2/1995
JP 11051964 A * 2/1999

(Continued)

*Primary Examiner* — Harshad R Patel
*Assistant Examiner* — Jamel Williams
(74) *Attorney, Agent, or Firm* — Harness Dickey & Pierce, P.L.C.

(57) ABSTRACT

A sensor unit includes a sensor module including a first plane and a second plane that crosses the first plane, and an armor body configured to house the sensor module. The armor body includes a first reference inner plane for positioning the first plane of the sensor module, a first reference outer plane parallel to the first reference inner plane and provided on an outer surface of the first reference inner plane, a second reference inner plane for positioning the second plane of the sensor module, and a second reference outer plane parallel to the second reference inner plane and provided on an outer surface of the second reference inner plane.

11 Claims, 9 Drawing Sheets

(58) Field of Classification Search
USPC .......................................................... 73/431
See application file for complete search history.

(56) References Cited

U.S. PATENT DOCUMENTS

| | | | | |
|---|---|---|---|---|
| 6,748,807 | B2* | 6/2004 | Yoshiuchi | G01P 1/023 |
| | | | | 73/493 |
| 6,917,142 | B2* | 7/2005 | Koyama | H03H 9/0547 |
| | | | | 310/344 |
| 9,209,121 | B2* | 12/2015 | Goida | H01L 23/04 |
| 2001/0054860 | A1* | 12/2001 | Knowles | H03H 9/215 |
| | | | | 310/370 |
| 2002/0180019 | A1* | 12/2002 | Saito | G01L 19/142 |
| | | | | 257/684 |
| 2004/0017004 | A1* | 1/2004 | Kasai | B32B 18/00 |
| | | | | 257/704 |
| 2007/0101812 | A1* | 5/2007 | MacGugan | B81B 7/007 |
| | | | | 73/493 |
| 2009/0322183 | A1* | 12/2009 | Kawakubo | G01C 19/5621 |
| | | | | 310/329 |
| 2012/0304765 | A1* | 12/2012 | Sakuma | G01C 19/5783 |
| | | | | 73/488 |
| 2012/0307459 | A1* | 12/2012 | Sakuma | G01D 11/30 |
| | | | | 361/728 |
| 2013/0014578 | A1* | 1/2013 | Sakuma | G01C 19/5769 |
| | | | | 73/431 |
| 2013/0037702 | A1* | 2/2013 | Minamikawa | H01L 25/167 |
| | | | | 250/221 |
| 2014/0285942 | A1* | 9/2014 | Nagashima | G05D 16/2013 |
| | | | | 361/178 |
| 2015/0129767 | A1* | 5/2015 | Kouznetsov, IV . | G01N 21/0303 |
| | | | | 250/341.1 |
| 2015/0226591 | A1* | 8/2015 | Speldrich | G01F 15/14 |
| | | | | 73/273 |
| 2016/0313288 | A1* | 10/2016 | Theuss | G01N 29/2425 |

FOREIGN PATENT DOCUMENTS

| | | | |
|---|---|---|---|
| JP | H11-051964 | A | 2/1999 |
| JP | 2001-183387 | A | 7/2001 |
| JP | 2001183387 | A * | 7/2001 |
| JP | 2012-251801 | A | 12/2012 |
| JP | 2012-251802 | A | 12/2012 |
| JP | 2013-019746 | A | 1/2013 |
| JP | 2013-019825 | A | 1/2013 |
| JP | 2013-019826 | A | 1/2013 |

* cited by examiner

[Fig. 1]
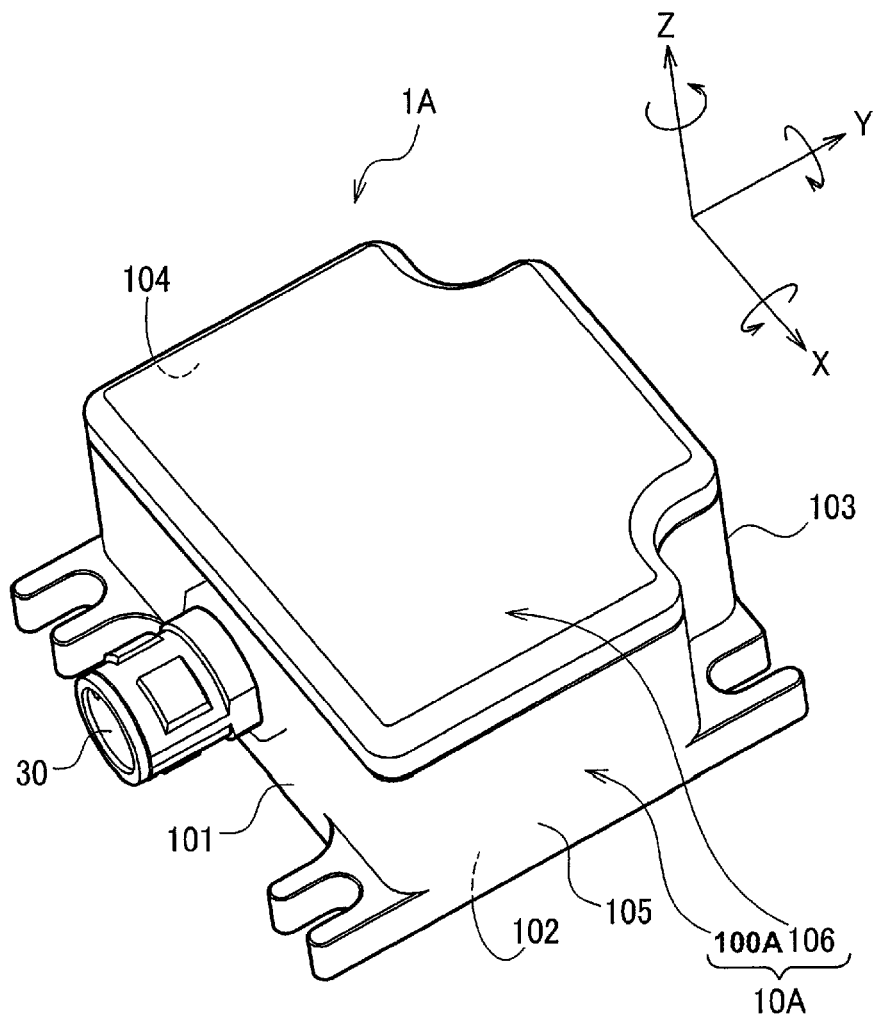

[Fig. 2]
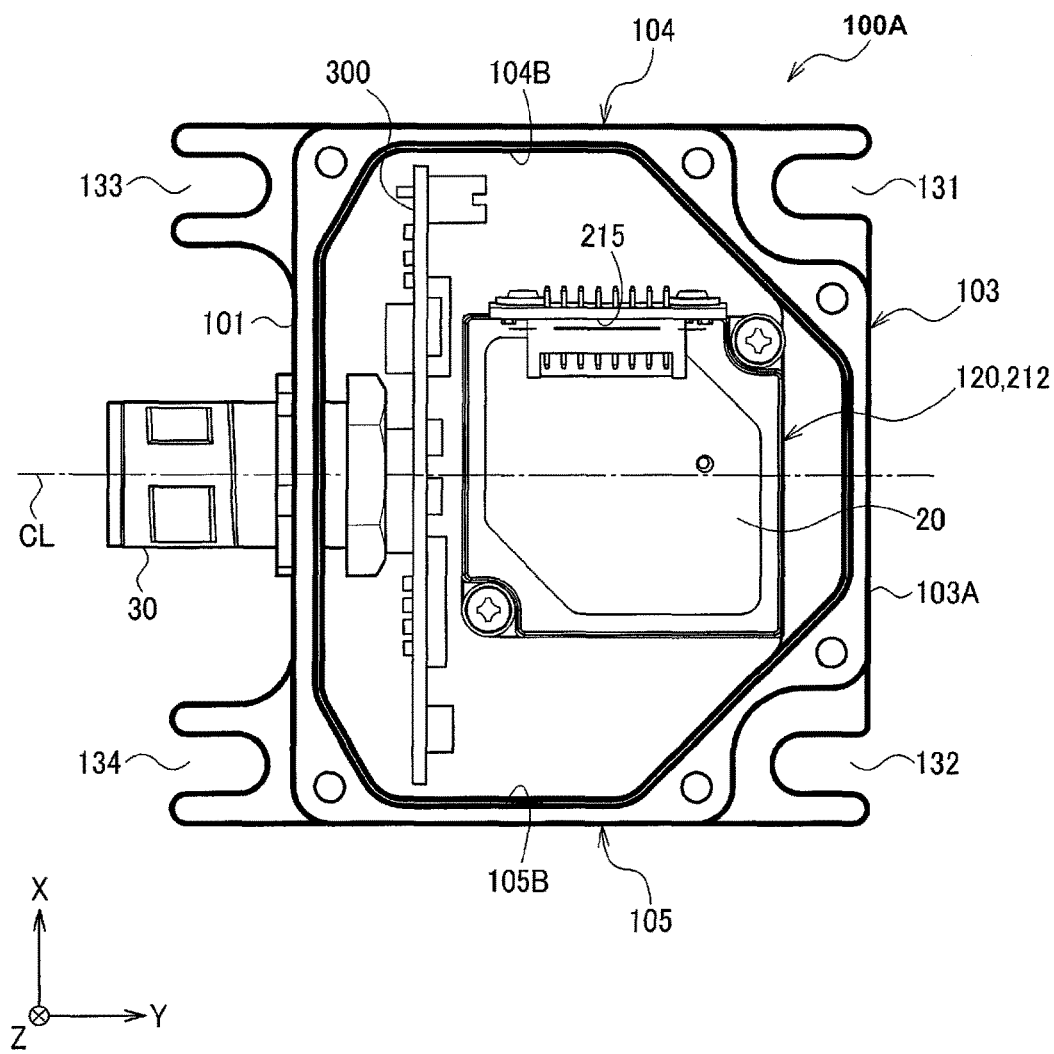

[Fig. 3]
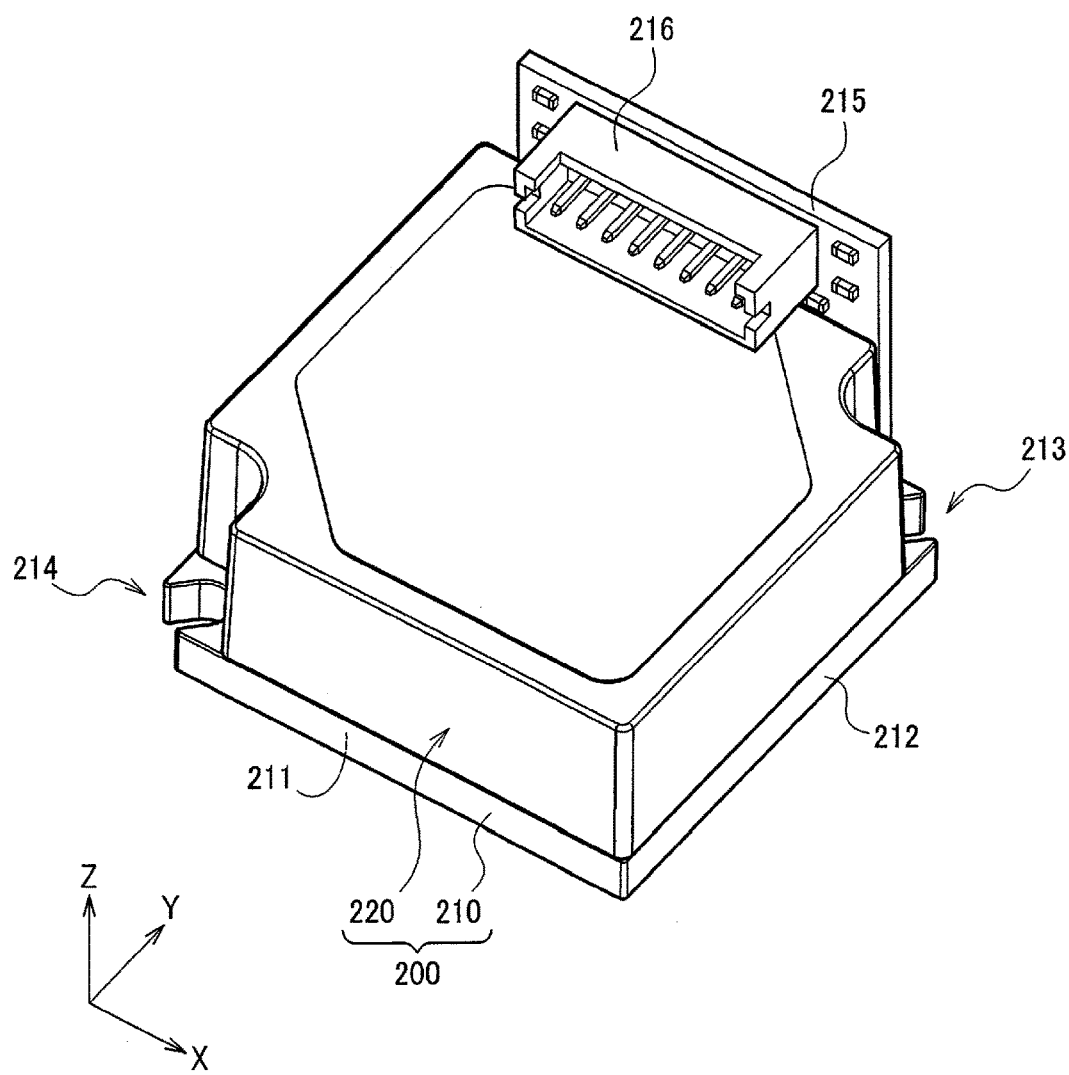

[Fig. 4]
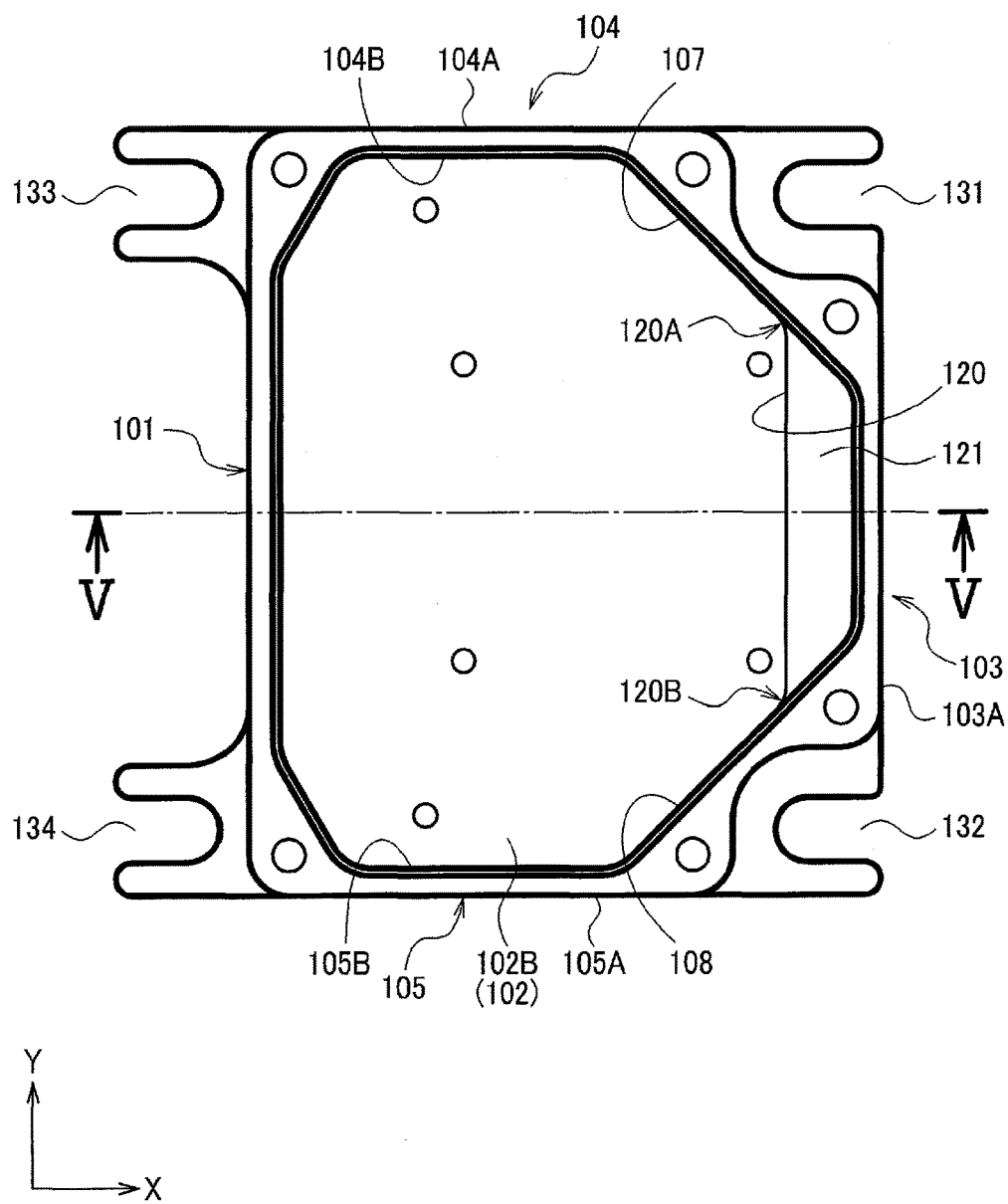

[Fig. 5]
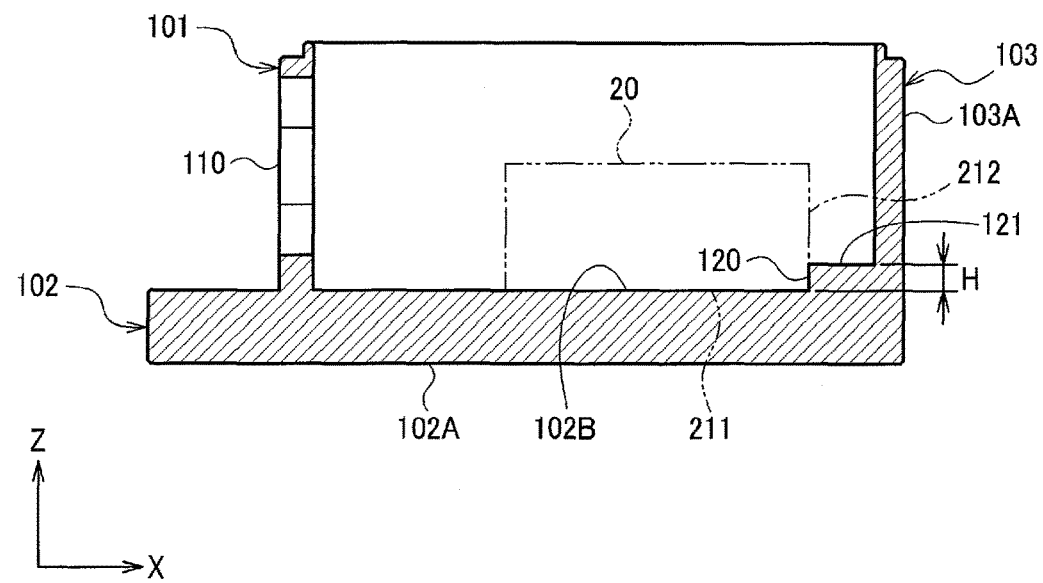
[Fig. 6]
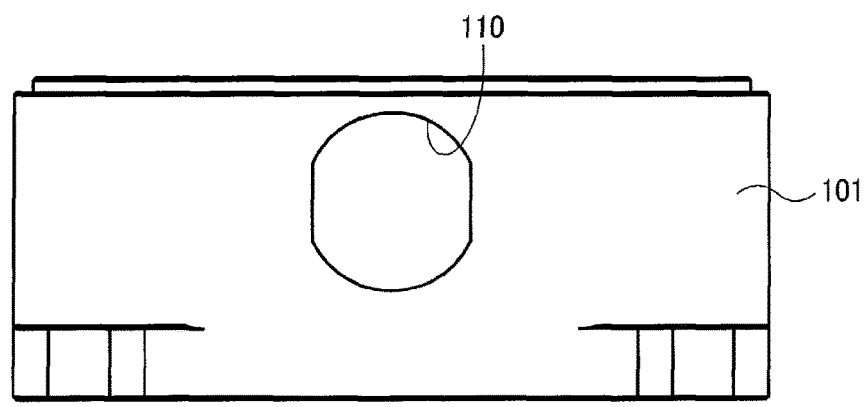

[Fig. 7]
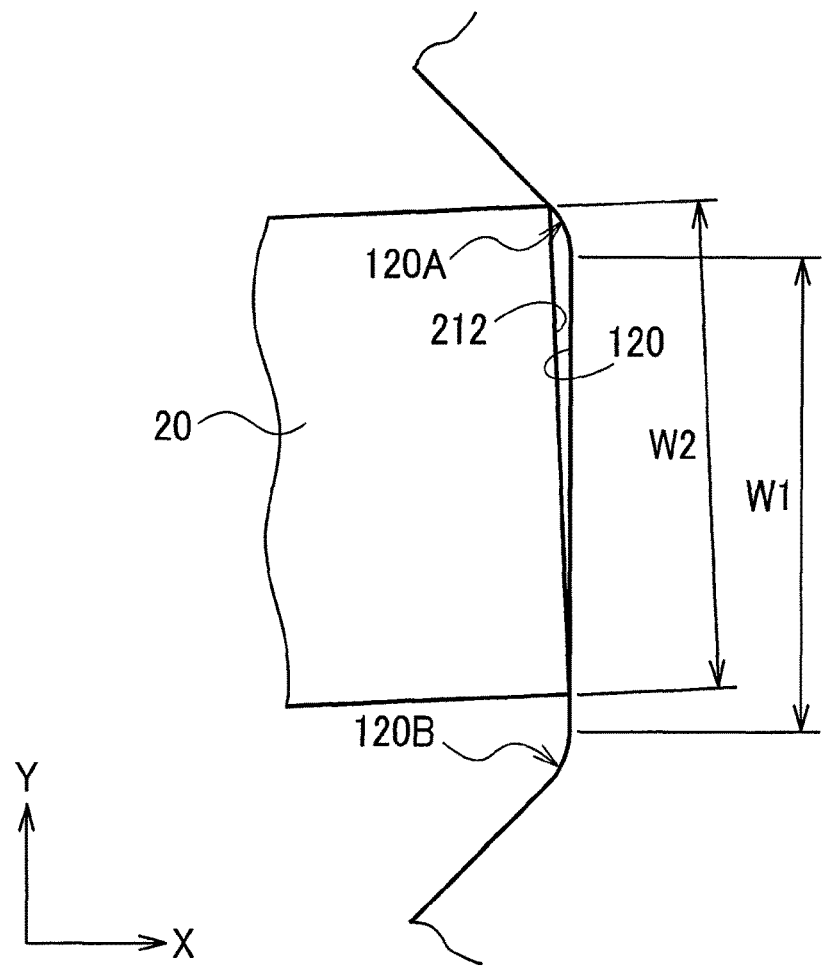
[Fig. 8]
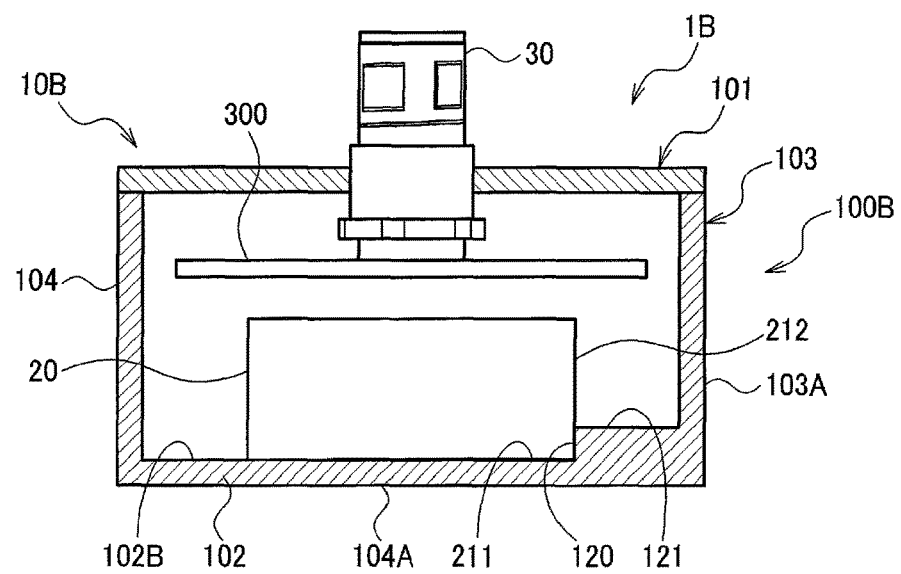

[Fig. 9]
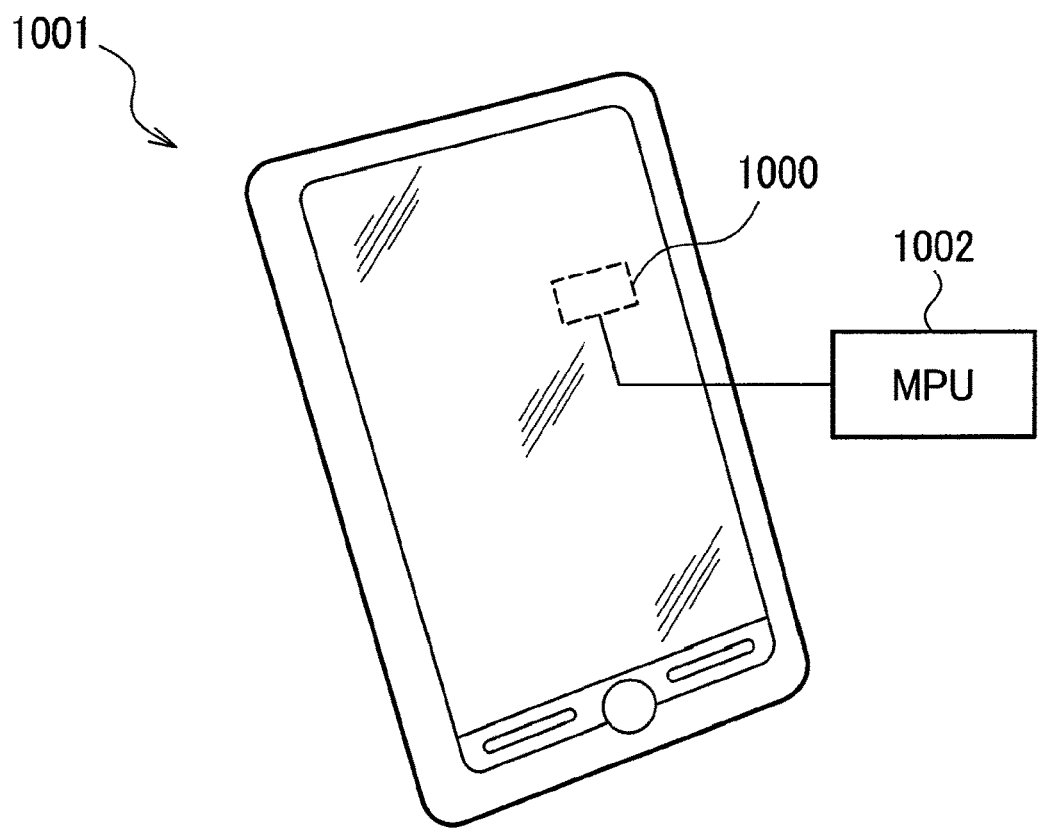

[Fig. 10]
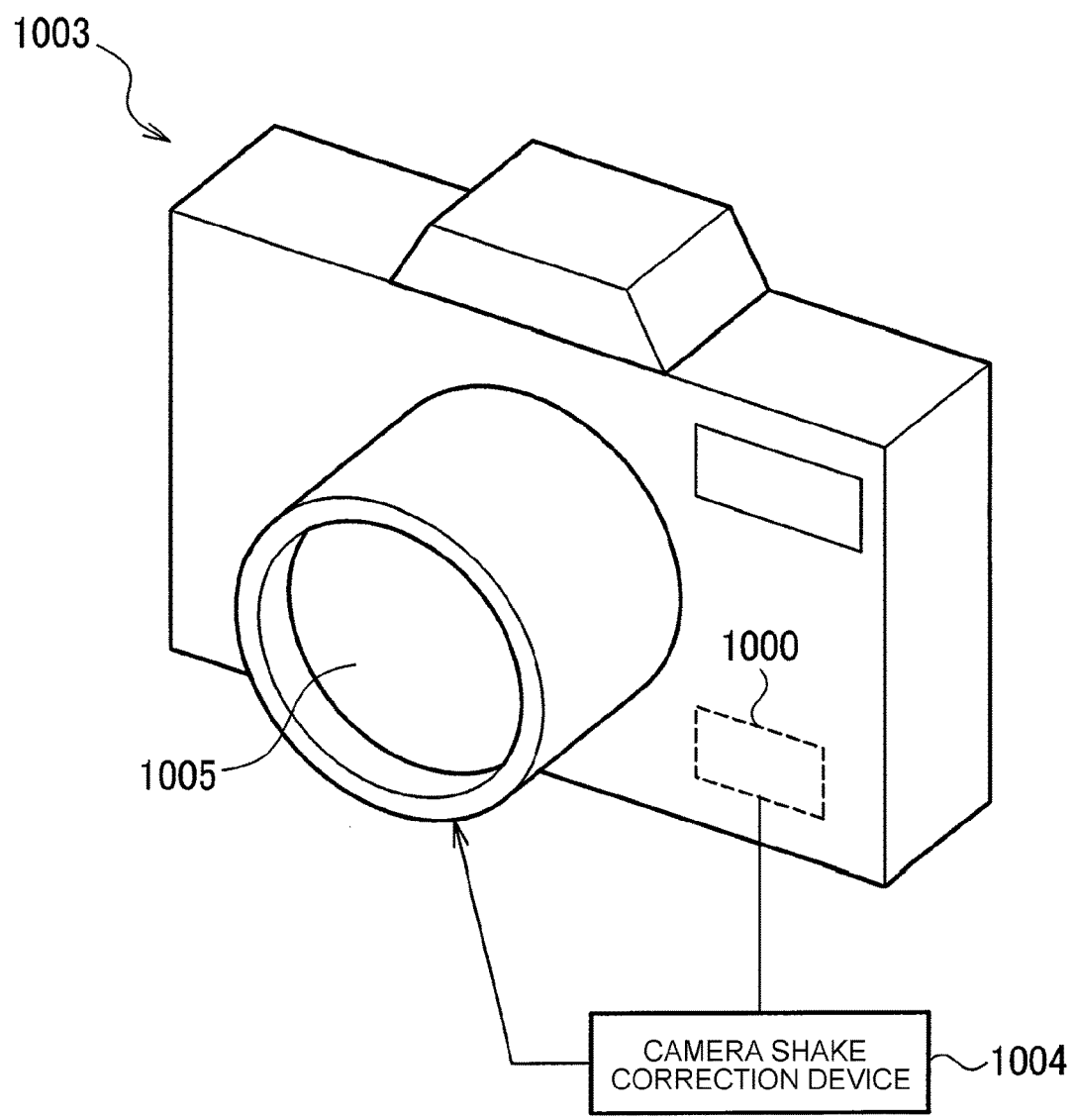

[Fig. 11]
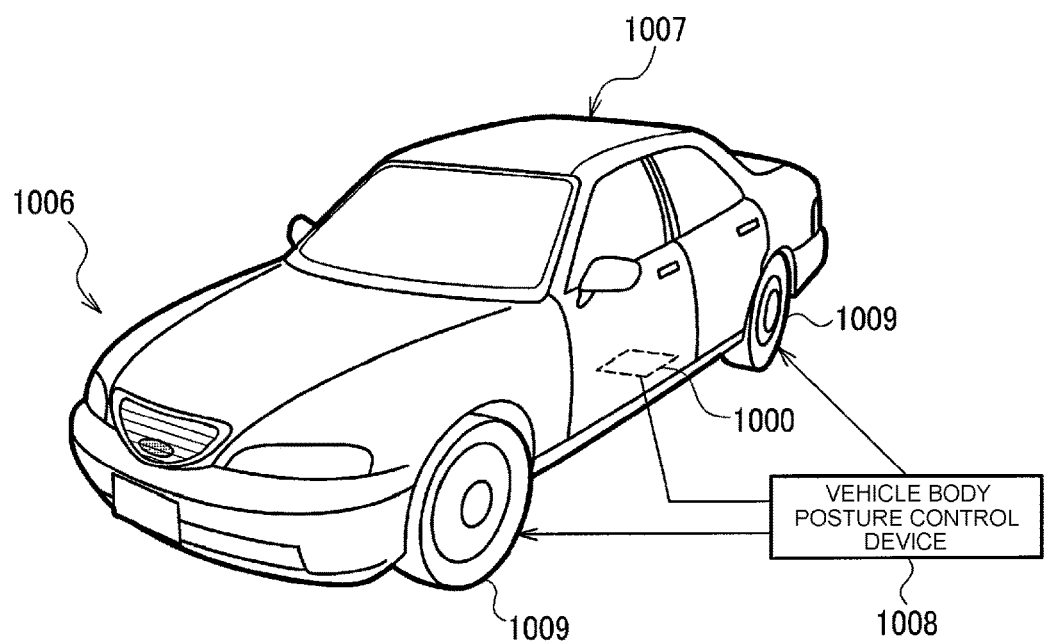

SENSOR UNIT, ARMOR BODY FOR SENSOR MODULE, ELECTRONIC DEVICE, AND MOVING OBJECT

CROSS-REFERENCE TO RELATED APPLICATIONS

This application is a U.S. National Phase Application under 35 U.S.C. 371 of International Application No. PCT/JP2014/001283, filed on Mar. 7, 2014. This application claims priority to Japanese Patent Application No. 2013-053258, filed Mar. 15, 2013. The entire disclosures of the above applications are expressly incorporated by reference herein.

TECHNICAL FIELD

The present invention relates to a sensor unit, an armor body for a sensor module, and an electronic device and a moving object including the sensor unit, and the like.

BACKGROUND ART

For example, JP-A-2012-251802 discloses a sensor module that aligns and houses a module including a three-axis gyro sensor for detecting angular velocities of three axes that cross one another. The sensor module is excellent in that the sensor module can easily and accurately position the module while enabling a reduction in size.

Technical Problem

When a user attaches the sensor module of this type to an object to be detected such as an electronic device or a moving object, the user sometimes has to secure environmental resistance in the sensor module. Examples of the environmental resistance include water resistance, pressure resistance, and shock resistance.

Therefore, it is preferable for the user to form the sensor module as a sensor unit in which the sensor module is housed in an armor body having environmental resistance rather than securing environmental resistance of the sensor module on the object to be detected side.

However, to attach the sensor module described in PTL 1 or the sensor unit in which the sensor module is housed in the armor body to the object to be detected, detection axes of the sensor module need to be aligned in specific directions of the object to be detected.

SUMMARY OF THE INVENTION

An advantage of some aspects of the invention is to provide a sensor unit that can unequivocally decide, when an armor body for securing environmental resistance in a sensor module is attached to an object to be detected such as an electronic device or a moving object, relative positions of detection axes of the sensor module with respect to the object to be detected, and the electronic device and the moving object including the sensor unit.

(1) An aspect of the invention relates to a sensor unit including: a sensor module including a first plane and a second plane that crosses the first plane; and an armor body configured to house the sensor module. The armor body includes: a first reference inner plane for positioning the first plane of the sensor module; a first reference outer plane parallel to the first reference inner plane and provided on an outer surface of the first reference inner plane; a second reference inner plane for positioning the second plane of the sensor module; and a second reference outer plane parallel to the second reference inner plane and provided on an outer surface of the second reference inner plane.

According to the aspect of the invention, the first plane and the second plane of the sensor module are positioned by the first reference inner plane and the second reference inner plane. Therefore, a relative position of the sensor module with respect to the armor body is unequivocally decided. The armor body includes the first reference outer plane and the second reference outer plane respectively parallel to the first reference inner plane and the second reference inner plane. When the first reference outer plane and the second reference outer plane are positioned with respect to an object to be detected to which the sensor unit is attached, a relative position of the sensor unit with respect to the object to be detected is unequivocally decided. Therefore, a relative position of the sensor module with respect to the object to be detected is also unequivocally decided. Consequently, since a relation between the first plane and the second plane of the sensor module and detection axes is fixed, relative positions of the detection axes of the sensor module with respect to the object to be detected are unequivocally decided.

(2) In one aspect of the invention, the sensor module includes a first detection axis and a second detection axis that crosses the first detection axis, the first reference inner plane is parallel to a plane defined by the first detection axis and the second detection axis, and the second reference inner plane is parallel to the first detection axis. Consequently, relative positions of the first and second detection axes of the sensor module with respect to the object to be detected are unequivocally decided.

(3) In one aspect of the invention, the armor body includes a bottom wall and a plurality of sidewalls erected on the bottom wall, and the sensor module is housed in an internal space surrounded by the bottom wall and the plurality of sidewalls. Consequently, it is possible to provide a sensor unit excellent in environmental resistance.

(4) In one aspect of the invention, in the armor body, the first reference inner plane is provided on a bottom surface on the internal space side. Consequently, it is possible to set, for example, a plane including the first detection axis and the second detection axis and the first reference inner plane of the sensor unit to be parallel to each other. Therefore, relative positions of the first and second detection axes of the sensor module with respect to the object to be detected are decided.

(5) In one aspect of the invention, in the armor body, the second reference inner plane is provided on a side surface on the internal space side. Consequently, relative positions of the first detection axis or the second detection axis of the sensor module with respect to the object to be detected is unequivocally decided.

(6) In one aspect of the invention, the armor body includes a step on a bottom surface on the internal space side, and the second reference inner plane is provided on a side surface of the step. Therefore, by setting the width and the height of the second reference inner plane small in a range necessary for positioning, it is possible to form the second reference inner plane on a plane having an area smaller than an area of the second reference inner plane formed on an inner wall surface of any one of outer walls itself of the armor body. Consequently, it is possible to reduce a machining area in machining the second reference inner plane to achieve perpendicularity to the bottom wall.

(7) In one aspect of the invention, a connector electrically connected to the sensor module is provided. Consequently, it is possible to easily electrically connect the sensor module and an external apparatus.

(8) In one aspect of the invention, in the armor body, a plane for positioning the sensor module is provided on at least one of both sides of the second reference inner plane. Then, when the sensor module is attached to the armor body, a setting position of the sensor module is unequivocally decided. Consequently, it is possible to prevent the sensor module from deviating from the second reference inner plane or make it easy to recognize that the sensor module has deviated from the second reference inner plane.

(9) Another aspect of the invention relates to an armor body for a sensor module that houses the sensor module. The armor body includes: a first reference inner plane for positioning a first plane of the sensor module housed in the armor body; a first reference outer plane parallel to the first reference inner plane and provided on an outer surface of the first reference inner plane; a second reference inner plane for positioning a second plane of the sensor module housed in the armor body; and a second reference outer plane parallel to the second reference inner plane and provided on an outer surface of the second reference inner plane.

According to the aspect of the invention, the first plane and the second plane of the sensor module housed in the armor body can be positioned by the first reference inner plane and the second reference inner plane of the armor body. Therefore, a relative position of the sensor module with respect to the armor body is unequivocally decided. The armor body includes the first reference outer plane and the second reference outer plane respectively parallel to the first reference inner plane and the second reference inner plane. When the first reference outer plane and the second reference outer plane are positioned with respect to an object to be detected to which the sensor unit is attached, a relative position of the sensor unit with respect to the object to be detected is unequivocally decided. Therefore, a relative position of the sensor module with respect to the object to be detected is also unequivocally decided. Consequently, since a relation between the first plane and the second plane of the sensor module and the detection axes is fixed, relative positions of the detection axes of the sensor module with respect to the object to be detected are unequivocally decided.

(10) Still another aspect of the invention relates to an electronic device including the sensor unit described in any one of (1) to (9).

(11) Yet another aspect of the invention relates to a moving object including the sensor unit described in any one of (1) to (9).

In the electronic device and the moving object according to the aspect of the invention, it is possible to unequivocally decide detection axes of the sensor module with respect to the electronic device and the moving object.

BRIEF DESCRIPTION OF THE DRAWINGS

FIG. 1 is a perspective view of a sensor unit according to a first embodiment of the invention.

FIG. 2 is a plan view showing a state in which a lid of the sensor unit shown in FIG. 1 is removed.

FIG. 3 is a perspective view of a sensor module incorporated in the sensor unit shown in FIG. 1.

FIG. 4 is a plan view of an armor body of the sensor unit shown in FIG. 1.

FIG. 5 is a V-V sectional view of FIG. 4.

FIG. 6 is a right side view of the armor body shown in FIG. 4.

FIG. 7 is an enlarged plan view for explaining planes formed at both ends of a second reference inner plane.

FIG. 8 is a schematic sectional view of a sensor unit according to a second embodiment of the invention.

FIG. 9 is a diagram showing an example of an electronic device including a gyro sensor.

FIG. 10 is a diagram showing another example of the electronic device including the gyro sensor.

FIG. 11 is a diagram showing an example of a moving object including a gyro sensor.

DETAILED DESCRIPTION OF THE PREFERRED EMBODIMENTS

Preferred embodiments of the invention are explained in detail below. Note that the embodiments explained below do not unduly limit contents of the invention described in the appended claims. All of components explained in the embodiments are not always essential as means for solution of the invention.

1. First Embodiment 1.1. Overview of a Sensor Unit

As shown in FIG. 1, a sensor unit 1A according to this embodiment includes, for example, a waterproof armor body 10A. The armor body 10A can be formed of metal, for example, aluminum. The armor body 10A includes a housing 100A and a lid 106. As shown in FIG. 2 in which the lid 106 is removed from the sensor unit 1A, a sensor module 20 and a connector 30 shown in FIG. 3 are arranged in the housing 100A. Among a plurality of wall sections forming the armor body 10A including the housing 100A and the lid 106, a wall section in which an opening 110 (see FIG. 6) for exposing the connector 30 to the outside is formed is referred to as first wall section 101. The connector 30 is fixed to and supported by a connector board 300 supported by the housing 100A. The connector 30 is a five-pin connector for connecting each of a plurality of sensor units to an external controller by a bus, for example, a CAN (Controller Area Network) bus. Electronic components for executing a protocol of a CAN can be mounted on the connector board 300.

As shown in FIG. 3 and FIG. 4, which is a V-V sectional view of FIG. 3, the housing 100A includes a bottom wall (a second wall section) 102 and the first wall section 101, a third wall section 103, a fourth wall section 104, and a fifth wall section 105 that vertically stand from the bottom wall 102. The lid 106 is a sixth wall section.

When orthogonal (crossing) three axes are represented as X, Y, and Z, the first wall section 101 and the third wall section 103 are opposed to each other in a Y direction. The fourth wall section 104 and the fifth wall section 105 are opposed to each other in an X direction. The second wall section (the bottom wall) 102 and the sixth wall section (the lid) 106 are opposed to each other in a Z direction. In the armor body 10A in this embodiment, a space between the housing 100A and the lid 106 and a space between the opening 110 and the connector 30 are sealed by, for example, gaskets to secure a waterproof structure.

1.2. Sensor Module

The sensor module 20 includes, as shown in FIG. 3, an interior body 200 arranged in the armor body 10A. The interior body 200 is formed of resin and does not have environmental resistance. The interior body 200 includes a bottom body 210 and a housing 220. An outer wall surface on which the bottom body 210 is exposed in the Z direction is referred to as first plane 211. An outer wall surface on which the bottom body 210 is exposed in the X direction is referred to as second plane 212. The first and second planes 211 and 212 function as reference planes for positioning when the sensor module 20 is attached to the armor body 10A.

As the sensor module 20, for example, the structure disclosed in PTL 1 can be used. A square frame-like holding member is provided on the inside of the interior body 200. A mounting board mounted with a sensor element is held by the holding member. The mounting board is obtained by coupling a rigid board and a flexible board. The mounting board forms a plane in an expanded state. A sensor element including at least first and second detection axes parallel to two axes (X and Y axes) or first to third detection axes parallel to three axes (X, Y, and Z axes) is mounted on the mounting board. The flexible board is bent. The rigid board and the flexible board are attached to a supporting member while being maintained parallel to the detection axes. The sensor element detects at least one of accelerations in directions extending along the detection axes and accelerations around the detection axes. In this embodiment, the sensor module 20 includes a three-axis acceleration sensor and a three-axis gyro sensor.

In the structure of PTL 1, alignment sections are provided at the four corners of the bottom body (the holding member) 210. The alignment sections position the supporting member with respect to the bottom body 210 in the X, Y, and Z-axis directions and the directions round the axes. That is, a plane defined by the first detection axis and the second detection axis is positioned to be parallel to the first plane (an X-Y plane) 211 of the sensor module 20. The first detection axis is positioned to be parallel to the second plane of the sensor module 20. The third axis is positioned to be orthogonal to (cross) the first plane 211.

The sensor module 20 includes cutout holes 213 and 214 for attachment in two places located on a diagonal in plan view of the bottom body 210. A relay board 215 can be attached to, for example, a side surface in the Y direction of the sensor module 20. The relay board 215 relays the rigid board and the flexible board on the inside of the interior body 200 and the connector board 300. The sensor element is provided on the rigid board and the flexible board on the inside of the interior body 200. An amplifier configured to amplify an analog signal from the sensor element, an A/D converter configured to convert the analog signal into a digital signal, a micro controller, a nonvolatile memory, a direction sensor (a magnetic sensor), or the like can be mounted on the rigid board and the flexible board on the inside of the interior body 200 or the relay board 215. An internal connector 216 configured to connect the connector board 300 and the relay board 215 can be provided on the relay board 215.

1.3. Positioning of the Sensor Module and the Armor Body and Positioning of the Sensor Unit and an Object to be Detected The housing 100A of the armor body 10A includes a first reference inner plane 102B for positioning the first plane 211 of the sensor module 20. The first reference inner plane 102B is formed on the inner surface of the bottom wall (the second wall section) 102. The housing 100A of the armor body 10A includes a first reference outer plane 102A parallel to the first reference inner plane 102B. The first reference outer plane 102A is formed on the outer surface of the bottom wall (the second wall section) 102.

The housing 100A of the armor body 10A includes a second reference inner plane 120 for positioning the second plane 212 of the sensor module 20. The housing 100A can include a step surface 121 parallel to the bottom wall (the second wall section) 102. In this case, the second reference inner plane 120 can be formed on a surface (a vertical surface) that connects the inner surface 102B of the bottom wall 102 and the step surface 121. Further, a second reference outer plane 103A is formed on the outer surface of the third wall section 103 parallel to the second reference inner plane 120.

When the sensor module 20 is attached to the housing 100A of the armor body 10A, the first and second planes 211 and 212 of the sensor module 20 are positioned on the first and second reference inner planes 102B and 120 of the housing 100A and bolts, onto which washers are inserted, are inserted into the cutout holes 213 and 214 (FIG. 3) to attach the sensor module 20 to the housing 100A of the armor body 10A.

The housing 100A of the armor body 10A includes, as shown in FIGS. 2 and 5, cutout holes 131 to 134 for attachment at the four corners. When the sensor unit 1A is attached to an object to be detected, the first and second reference outer planes 102A and 103A of the housing 100A are positioned on the object to be detected and bolts, onto which washers are inserted, are inserted into the cutout holes 131 to 134 to fasten the sensor unit 1A to the object to be detected.

As indicated by a chain line in FIG. 5, the first plane 211 and the second plane 212 of the sensor module 20 are positioned on the first reference inner plane 102B and the second reference inner plane 120 formed in the housing 100A of the armor body 10A. Consequently, a relative position of the sensor module 20 with respect to the armor body 10A is unequivocally decided. The armor body 10A includes the first reference outer plane 102A and the second reference outer plane 103A respectively parallel to the first reference inner plane 102B and the second reference inner plane 120. When the first reference outer plane 102A and the second reference outer plane 103A are positioned with respect to the object to be detected to which the sensor unit 1A is attached, a relative position of the sensor unit 1A with respect to the object to be detected is unequivocally decided. Therefore, a relative position of the sensor module 20 with respect to the object to be detected is also unequivocally decided. Consequently, since a relation between the first plane 211 and the second plane 212 of the sensor module 20 and the detection axes is fixed, relative positions of the detection axes of the sensor module 20 with respect to the object to be detected are unequivocally decided.

A plane defined by the first detection axis and the second detection axis of the sensor module 20 can be set parallel to the bottom wall 102 of the armor body 10A. If the first reference outer plane 102A of the armor body 10A is positioned on the object to be detected, the plane defined by the first detection axis and the second detection axis of the sensor module 20 is parallel to an X-Y plane defined by the object to be detected. The second reference inner plane 120 and the second reference outer plane 103A are parallel to the first detection axis of the sensor module 20. Consequently, the first to third detection axes of the sensor module 20 are also parallel to the X, Y, and Z axes set concerning the object to be detected.

In this embodiment, the second reference inner plane 120 is formed on a surface that connects the inner surface 102B of the bottom wall 102 and the step surface 121. In this way, the width and the height of the second reference inner plane 120 are set sufficiently small in a range necessary for positioning and the second reference inner plane 120 can be formed on a plane having an area smaller than an area of the second reference inner plane 120 formed on an inner wall surface of any one of the wall sections 101 and 103 to 105 itself of the armor body 10A. Consequently, it is possible to reduce a machining area in machining the second reference inner plane 120 to achieve perpendicularity to the bottom wall 102. This is because, since the second reference inner plane 120 is used for positioning of the second plane 212 of the sensor module 20, more highly accurate perpendicularity is sometimes requested. In this case, the perpendicularity of the second reference inner plane 120 is secured by shaving. Since a machining area in shaving the second reference inner plane 120 is small as explained above, a machining time can be reduced.

The metal housing 100A can be machined by shaving a metal material. Alternatively, the metal housing 100A may be molded by a die. In particular, in the molding, since draft angles are formed on the second reference inner plane 120 and the second reference outer plane 103A and perpendicularity is inferior, it is preferable to carry out additional shaving for improving the perpendicularity.

In this embodiment, as shown in FIG. 4, inner surfaces 104B and 105B of the fourth and fifth wall sections 104 and 105 are coupled to an inner surface 103B of the third wall section 103 via inclined inner walls 107 and 108 inclined with respect to the X axis in plan view. A space between the inclined inner walls 107 and 108 decreases toward the inner surface 103B of the third wall section 103. Therefore, width W1 (see FIG. 7) in the Y direction of the second reference inner plane 120 arranged between the inclined inner walls 107 and 108 in plan view is set slightly larger than width W2 (see FIG. 7) in the Y direction of the sensor module 20. Height H between an inner surface 102B of the bottom wall 102 and the step surface 121 shown in FIG. 5 can also be set small in a range in which positioning can be performed (e.g., H=1 mm). In this way, an area (W1*H) of the second reference inner plane 120 can be reduced.

In this embodiment, as shown in FIG. 7 in enlargement, the sensor module 20 can include surfaces 120A and 120B, which cross the second reference inner plane 120, at both ends in a direction in which the second reference inner plane 120 of the housing 100A extends in parallel to the Y direction. The surfaces 120A and 120B can be formed by curved surfaces. Then, when the sensor module 20 is attached to the housing 100A, if a Y-direction position of the sensor module 20 deviates as shown in FIG. 7, the sensor module 20 interferes with one of the surfaces 120A and 120B. Consequently, it is possible to make it easy to visually and sensibly recognize that the sensor module 20 has deviated from the second reference inner plane 120. The surfaces 120A and 120B are not limited to the curved surfaces and may be formed of the inclined inner walls 107 and 108 themselves.

The surfaces 120A and 120B may be guide planes that vertically stand from the second reference inner plane 120 toward the Y direction. The guide surfaces 120A and 120B prevent the sensor module 20 from deviating from the second reference inner plane 120. Position accuracy in the Y direction of the sensor module 20 is demanded in this way in order to set a Y-direction position of the third detection axis (the Z axis) of the sensor module 20. For example, the third detection axis (the Z axis) can be set on a center axis CL of the housing 100A shown in FIG. 2.

In this embodiment, as shown in FIG. 2, FIG. 4, and FIG. 5, the first wall section 101 and the third wall section 103 are opposed to each other in the X direction. Therefore, as shown in FIG. 2, the second reference inner plane 120 parallel to the second reference outer plane 103A formed in the third wall section 103 is orthogonal to (crosses) the center axis CL of the connector 30 (the center axis CL of the housing 100A). On the other hand, it is also possible to set the second reference inner plane 120 on one of the inner surfaces 104B and 105B of the fourth and fifth wall sections 104 and 105 shown in FIG. 2. However, in that case, the sensor module 20 is arranged closer to one side than the center axis CL of the connector 30 (the center axis CL of the housing 100A). A weight balance of the sensor unit 1A is deteriorated. In this embodiment, it is easy to align the center axis CL of the connector 30 (the center axis CL of the housing 100A) and the center axis of the sensor module 20. It is possible to configure the sensor unit 1A having good weight balance.

In this embodiment, as shown in FIG. 2, the second plane 212 of the sensor module 20 is formed on a surface opposed to the third wall section 103 of the housing 100A. Then, the second reference inner wall plane 120 for positioning the second plane 212 of the sensor module 20 and the second reference outer plane 103A formed in the third wall section 103 of the housing 100A can be arranged close to each other. Dimensional accuracy (parallelism) between the second reference inner plane 120 and the second reference outer plane 103A is easily achieved. Moreover, it is possible to reduce the length of the sensor unit 1A in the Y direction in which the connector 30 projects and reduce the size of the sensor module 20.

In this embodiment, as shown in FIG. 2, the connector board 300 can be supported along the X direction parallel to the first wall section 101 between the first wall section 101 and the sensor module 20. Then, the length of the first wall section 101 is designed according to the length of the connector board 300. In that case, the position of the second reference outer plane 103A formed in the third wall section 103 opposed to the first wall section 101 and the position of the second reference inner plane 120 do not depend on the length of the first wall section 101. That is, a basic design concept of the first and second reference inner planes 102B and 120 and the like for positioning the first and second planes 211 and 212 of the sensor module 20 is not changed.

In this embodiment, as shown in FIG. 2, the relay board 215 is arranged in the sensor module 20 between one of the fourth wall section 104 and the fifth wall section 105 and the sensor module 20. As explained above, it is easy to secure spaces on both sides in the X direction of the sensor module 20 in FIG. 2. In this way, it is possible to attach the relay board 215 to the sensor module 20 making use of a space secured between one of the fourth wall section 104 and the fifth wall section 105 and the sensor module 20. It is undesirable to arrange the relay board 215 between one of the first wall section 101 and the third wall section 103 and the sensor module 20 because the Y-direction length of the armor body 10A is increased.

2. Second Embodiment

FIG. 8 shows a sensor unit 1B according to a second embodiment of the invention. In FIG. 8, members having functions same as the functions in the first embodiment are denoted by reference numerals and signs same as the reference numerals and signs in FIG. 1 to FIG. 7 and detailed explanation of the members is omitted. In FIG. 8, the relay board 215 is not shown.

In FIG. 8, the sensor unit 1B includes an armor body 10B in which the sensor module 20 and the connector 30 are arranged. The armor body 10B includes the first wall section 101 functioning as a lid unlike the first wall section 101 in the first embodiment and a housing 100B. The housing 100B includes a bottom wall formed by the second wall section 102 as in the first embodiment. The housing 100B includes the third wall section 103, the fourth wall section 104, the fifth wall section 105, and the sixth wall section 106 (signs 105 and 106 are omitted in FIG. 8) standing from the bottom wall 102.

In the second embodiment, as in the first embodiment, the first reference inner plane 102B and the first reference outer plane 102A can be formed on the bottom wall (the second wall section) 102. A plane defined by the first detection axis and the second detection axis of the sensor module 20 can be set in parallel to the armor body 10B and the X-Y plane of the object to be detected to which the armor body 10B is attached.

In FIG. 8, as in the first embodiment, the outer surface of the third wall section 103 is formed as the second reference outer plane 103A and the surface that connects the inner surface 102B of the bottom wall 102 and the step surface 121 is formed as the second reference inner plane 120.

Therefore, in the second embodiment, as in the first embodiment, the first detection axis of the sensor module 20 can be set in parallel to the armor body 10B and the X axis of the object to be detected to which the armor body 10B is attached. However, the second reference inner plane 120 is not limited to be set in parallel to the third wall section 103 and can be set in parallel to any one of the third to sixth wall sections 103 to 106, which are the sidewalls.

In the second embodiment, unlike the first embodiment, the sensor unit 1B of a type in which the connector 30 is exposed in the lid (the first wall section) 101 can be configured. However, action and effects same as the action and effects in the first embodiment can be attained.

3. Electronic Device and Moving Object

FIG. 9 schematically shows a smart phone 1001 as a specific example of an electronic device. A gyro sensor 1000 including the sensor unit 1A (1B) is incorporated in the smart phone 1001. The gyro sensor 1000 can detect the posture of the smart phone 1001. So-called motion sensing is carried out. A detection signal of the gyro sensor 1000 can be supplied to, for example, a microcomputer chip (MPU) 1002. The MPU 1002 can execute various kinds of processing according to the motion sensing. Besides, the motion sensing can be used in various electronic devices such as a cellular phone, a portable game machine, a game controller, a car navigation system, a pointing device, a head-mounted display, and a tablet personal computer.

FIG. 10 schematically shows a digital still camera (hereinafter referred to as "camera") 1003 as another specific example of the electronic device. The gyro sensor 1000 including the sensor unit 1A (1B) is incorporated in the camera 1003. The gyro sensor 1000 can detect the posture of the camera 1003. A detection signal of the gyro sensor 1000 can be supplied to a camera shake correction device 1004. The camera shake correction device 1004 can move, for example, a specific lens in a lens set 1005 according to the detection signal of the gyro sensor 1000. In this way, a camera shake can be corrected. Besides, the camera shake correction can be used in a digital video camera.

FIG. 11 schematically shows an automobile 1006 as a specific example of a moving object. The gyro sensor 1000 including the sensor unit 1A (1B) is incorporated in the automobile 1006. The gyro sensor 1000 can detect the posture of a vehicle body 1007. A detection signal of the gyro sensor 1000 can be supplied to a vehicle body posture control device 1008. The vehicle body posture control device 1008 can control the hardness of a suspension according to, for example, the posture of the vehicle body 1007 and control brakes of respective wheels 1009. Besides, the posture control can be used in various mobile bodies such as a biped walking robot, an airplane, and a helicopter.

The embodiments are explained in detail above. However, those skilled in the art could easily understand that various modifications not substantively departing from the new matters and the effects of the invention are possible. Therefore, all such modifications are considered to be included in the scope of the invention. For example, in the specification or the drawings, the terms described at least once together with broader or synonymous different terms in the specification or the drawings can be replaced with the different terms. The configurations and the operations of the sensor units 1A and 1B, the armor bodies 10A and 10B, the sensor module 20, the connector 30, the housings 100A and 100B, the lid 106, and the like are not limited to those explained in the embodiments. Various modifications of the configurations and the operations are possible. For example, the wired connection in the embodiment can be replaced with wireless connection.

For example, in FIG. 5, the bottom wall (the second wall section) 102 and the first and third to fifth wall sections 101 and 103 to 105 may be provided as separate members. In that case, all of the first and second reference inner planes 102B and 120 and the first and second reference outer planes 102A and 103A only have to be formed on the bottom wall 102. The connector 30 is not limited to project outward from the first wall section 101. An end of the connector 30 may be exposed, for example, in flush with the first wall section 101.

What is claimed is:
1. A sensor unit comprising:
a sensor module including a first plane and a second plane that crosses the first plane; and
an armor body configured to house the sensor module, wherein
the armor body includes:
a first reference inner plane for positioning the first plane of the sensor module;
a first reference outer plane parallel to the first reference inner plane and provided on an outer surface of the first reference inner plane;
a second reference inner plane for positioning the second plane of the sensor module;
a second reference outer plane parallel to the second reference inner plane and provided on an outer surface of the second reference inner plane;
a first wall section parallel to the second reference inner plane and the second reference outer plane and separated from the second reference inner plane by the first reference inner plane, the first wall section including an opening for receiving a connector; and
first and second inclined inner walls intersecting with the second reference inner plane, the sensor module being positioned adjacent to the first and second inclined inner walls, wherein a space between the first and second inclined inner walls decreases as the first and second inner walls extend toward the second reference inner plane such that when the sensor module is positioned adjacent to the first and second inclined inner walls, the first and second inclined inner walls align the sensor module with a center axis of the connector, wherein the sensor module includes a first detection axis and a second detection axis that crosses the first detection axis, the first reference inner plane is parallel to a plane defined by the first detection axis and the second detection axis, and the second reference inner plane is parallel to the first detection axis.

2. The sensor unit according to claim 1, wherein the armor body includes a bottom wall and a plurality of sidewalls erected on the bottom wall, and the sensor module is housed in an internal space surrounded by the bottom wall and the plurality of sidewalls.

3. The sensor unit according to claim 2, wherein, in the armor body, the first reference inner plane is provided on a bottom surface on the internal space side.

4. The sensor unit according to claim 2, wherein, in the armor body, the second reference inner plane is provided on a side surface on the internal space side.

5. The sensor unit according to claim 2, wherein the armor body includes a step on a bottom surface on the internal space side, and the second reference inner plane is provided on a side surface of the step.

6. The sensor unit according to claim 2, wherein, in the armor body, a plane for positioning the sensor module is provided on at least one of both sides of the second reference inner plane.

7. The sensor unit according to claim 1, wherein a connector electrically connected to the sensor module is provided.

8. The sensor unit of claim 1, wherein the sensor module includes the first detection axis, the second detection axis, and a third detection axis, the second detection axis crossing the first detection axis and the third detection axis crossing the second detection axis, and the second reference inner plane is parallel to a plane defined by the first detection axis and the third detection axis.

9. The sensor unit of claim 1, further comprising:

a connector board fixed to a connector; and a relay board fixed to the sensor module, wherein the armor body is configured to house the sensor module, relay board, and connector board, the armor body further includes a housing having a plurality of wall sections defining an inner cavity for housing the sensor module, the plurality of wall sections including the first wall section, a second wall section, a third wall section, and a fourth wall section, the first wall section including the opening for receiving the connector fixed to the connector board, the first inclined inner wall extends from the second wall section to the third wall section and the second inclined inner wall extends from the fourth wall section to the third wall section, and a step extends from the first inclined inner wall to the second inclined inner wall and is parallel to the second reference inner plane, the sensor module abuts a surface of the step, the connector board extends parallel to the second reference inner plane and the relay board is fixed to a wall of the sensor module extending orthogonal to the second reference inner plane, and the step and the first and second inclined inner walls align the sensor module with a center axis of the connector.

10. An armor body for a sensor module that houses the sensor module, the armor body comprising:

a first reference inner plane for positioning a first plane of the sensor module housed in the armor body;

a first reference outer plane parallel to the first reference inner plane and provided on an outer surface of the first reference inner plane;

a second reference inner plane for positioning a second plane of the sensor module housed in the armor body;

a second reference outer plane parallel to the second reference inner plane and provided on an outer surface of the second reference inner plane;

a first wall section parallel to the second reference inner plane and the second reference outer plane and separated from the second reference inner plane by the first reference inner plane, the first wall section including an opening for receiving a connector, and first and second inclined inner walls intersecting with the second reference inner plane, the sensor module being positioned adjacent to the first and second inclined inner walls, wherein a space between the first and second inclined inner walls decreases as the first and second inner walls extend toward the second reference inner plane such that when the sensor module is positioned adjacent to the first and second inclined inner walls, the first and second inclined inner walls align the sensor module with a center axis of the connector.

11. The armor body of claim 10, further comprising: a connector board fixed to a connector; and a relay board fixed to the sensor module, wherein the armor body is configured to house the sensor module, relay board, and connector board, the armor body further includes a housing having a plurality of wall sections defining an inner cavity for housing the sensor module, the plurality of wall sections including the first wall section, a second wall section, a third wall section, and a fourth wall section, the first wall section including the opening for receiving the connector fixed to the connector board, the first inclined inner wall extends from the second wall section to the third wall section and the second inclined inner wall extends from the fourth wall section to the third wall section, and a step extends from the first inclined inner wall to the second inclined inner wall and is parallel to the second reference inner plane, the sensor module abuts a surface of the step, the connector board extends parallel to the second reference inner plane and the relay board is fixed to a wall of the sensor module extending orthogonal to the second reference inner plane, and the step and the first and second inclined inner walls align the sensor module with a center axis of the connector.

* * * * *